US006767465B1

(12) United States Patent
Choung et al.

(10) Patent No.: US 6,767,465 B1
(45) Date of Patent: Jul. 27, 2004

(54) PROCESS FOR TREATING FINE COAL PARTICLES

(75) Inventors: Jaewon Choung, Edmonton (CA); Jozef Szymanski, Edmonton (CA); Zhenghe Xu, Edmonton (CA)

(73) Assignee: Govenors of the University of Alberta, Edmonton (CA)

( * ) Notice: Subject to any disclaimer, the term of this patent is extended or adjusted under 35 U.S.C. 154(b) by 88 days.

(21) Appl. No.: 10/019,667

(22) PCT Filed: Jul. 4, 2000

(86) PCT No.: PCT/CA00/00788

§ 371 (c)(1), (2), (4) Date: Jan. 2, 2002

(87) PCT Pub. No.: WO01/03843

PCT Pub. Date: Jan. 18, 2001

Related U.S. Application Data

(60) Provisional application No. 60/142,779, filed on Jul. 8, 1999.

(51) Int. Cl.[7] .................................................. C02F 1/26

(52) U.S. Cl. ............................ 210/638; 44/626; 209/5; 210/727; 210/728

(58) Field of Search ............................... 44/626; 209/5; 210/634, 638, 639, 705, 725, 727, 728, 729, 732, 734, 778

(56) References Cited

U.S. PATENT DOCUMENTS

| | | | | |
|---|---|---|---|---|
| 4,210,531 A | * | 7/1980 | Wang et al. | 210/727 |
| 4,456,528 A | | 6/1984 | Akimoto et al. | |
| 4,477,353 A | * | 10/1984 | Messer | 210/633 |
| 4,770,766 A | * | 9/1988 | Keller et al. | 209/5 |
| 6,526,675 B1 | * | 3/2003 | Yoon | 34/424 |

FOREIGN PATENT DOCUMENTS

| | | |
|---|---|---|
| CA | 1170997 | 7/1984 |
| GB | 1584673 | 2/1981 |
| GB | 1507601 | 4/1984 |
| JP | 57170998 | 10/1982 |
| JP | 59105090 | 6/1984 |

OTHER PUBLICATIONS

PCT search report, PCT/CA99/00788.

"Review of Oil Agglomeration Techniques for Processing of Fine Coals" V.P. Mehrotra et al. International Journal of Mineral Processing. 11(1983).

"Finding the economic limit of fine coal cleaning" C. Norton Coal Mining Sep. 1984.

* cited by examiner

*Primary Examiner*—Peter A. Hruskoci
(74) *Attorney, Agent, or Firm*—C. A. Rowley

(57) ABSTRACT

A process for recovering fine coals and clarifying water for recycling features with three distinct mechanisms: hydrophobic extraction, electrolyte coagulation, and macromolecular flocculation, which if desired may be integrated into a single stage. The hydrophobic extraction is accomplished using oil to form a coal-in-oil mixture. The process water is clarified using a flocculants, more preferably a combination of coagulant and anionic flocculants. With a well defined reagent addition scheme, this process allows a combustible recovery greater than 88% at an ash content less than 11%, while producing a clean water containing less than 20 ppm suspended solids from a tailing's stream. The coal-in-oil mixture may be used as a fuel for example in coal-firing boilers and power generators.

12 Claims, 5 Drawing Sheets a) b) c) d)

PROCESS FOR TREATING FINE COAL PARTICLES

CROSS-REFERENCE TO RELATED APPLICATIONS

The benefit under Title 35 United States Code § 119(e) based on U.S. Provisional application No. 60/142,779 field Jul. 8, 1999 is claimed.

Foreign priority is claimed under Title 35 United States Code § 119(a) (d) or § 365 (b) based on PCT application no PCT/CA00/00788 filed Jul. 4, 2000.

FIELD OF THE INVENTION

The present invention relates to the recovery of coal fines as a valuable product and the clarification of water for recycling from coal tailings permitting the use of a single stage unit operation.

BACKGROUND OF THE INVENTION

A recognized challenge in coal industry is inefficient recovery of coal fines, compounded with the trend of producing more fines with continuous mining systems and subsequent coal preparation operations. Until very recent years, fine coals were merely washed to large volume of tailings stream, not only losing energy resources but also having some environmental consequences. Coal tailings typically contain less than 3% solids and about 60% of the solids are coal. Considering that a large quantity of water has to be treated before recycle or safe discharge to the environment, economics dictate that as much of the marketable coal as possible should be recovered from the tailings and water contained in the tailings be recycled if possible. From both economic and environmental considerations, the incentive to recover fine coal from a tailings stream (and/or use the water) is evident.

A few processes have been tested for recovering fine coals from tailings stream, including froth flotation and oil agglomeration. Although froth flotation featuring with microbubble technology had some success in recovering fine coals, thermal efficiency of the recovered coal is in general low due to the presence of surface moisture, encumbered by large surface areas (see for example NORTON, J., 1984. Finding the Economic Limit of Fine Coal Cleaning, Coal Mining, September, p. 38–40.). In addition, the discharge from flotation circuit remains to contain large amount of mineral matters including fine clays, which are difficult to remove by conventional filtration or thickening.

Oil agglomeration, on the other hand, appears to be promising in recovering fine coals, as there is virtually no lower particle size limit and the ultimate floatability of coal is less affected by size compared to froth flotation (MEHROTRA, V. P., SASTRY, K. V. S. and MOREY, B. W., 1983. Review of Oil Agglomeration Techniques for Processing of Fine Coals, Int. J. Miner. Process. 11, p. 175–201.). An attractive feature of oil agglomeration process is a product of low moisture content. However, the recovered fine coals still need to be pelletized by adding an extra amount of heavy oil and screened to a few millimeters in diameter, to facilitate the storage and handling and to ensure an effective flame contact in combustion chambers. As in froth flotation, a second stage treatment to remove fine particles from process effluent for water recycle is needed with the oil agglomeration process.

BRIEF DESCRIPTION OF THE INVENTION

An object of the invention is to provide an economic process capable of recovering fine coals and cleaning up process water for recycle, preferably in an integrated, single stage operation. Broadly the present invention related to extracting coal fines from an aqueous phase suspended coal fines and hydrophilic mineral matters comprising mixing an extraction oil with the coal fines suspended in said aqueous phase, the oil being added in an amount effective to extract the coal fines by hydrophobic extraction and form a non-aqueous phase containing said coal fines and said oil and a modified aqueous phase containing said hydrophilic mineral matters, adding at least one of a flocculating agent, a coagulating agent or a combination of said flocculating agent and said coagulating agent to said aqueous phase or said modified aqueous phase to facilitate the separation of said hydrophilic mineral matters from said aqueous phase to form a clarified aqueous phase and disposing of said mineral matters from clarified aqueous phase.

Preferably said mixing of said extraction oil for recovering fine coals and said addition of said at least one of said flocculating agent, said coagulating agent or said combination of the two for clarification of process water are integrated into a single stage.

Preferably said one stage includes removing the separated mineral matters from the aqueous phase to provide said a clarified aqueous phase for recycling.

Preferably said extraction oil will be added in the amount of between about 100 and 250% based on the dry weight of the coal fines in the suspension.

Preferably said extraction oil will be selected from the group consisting of heavy crude, light mineral oils, fuel oils and landfill gas condensates.

Preferably said one comprises said flocculating agent, which is added to a concentration below 30 ppm.

Preferably said flocculating agent is selected from the group comprising cationic or anionic flocculants.

Preferably said one comprises said coagulating agent is added to a concentration of up to about 1000 ppm.

Preferably said coagulating agent is selected from the group comprising positively charged aluminum hydrosols and calcium, magnesium or other multivalent cations.

Preferably said one comprises said combination of said flocculating agent and said coagulating agent is used for separation of said hydrophilic mineral matters from said modified aqueous suspension.

Preferably said flocculating agent will be an anionic flocculant and said coagulating agent will be multivalent cations.

Preferably said flocculating agent and said coagulating agent are mixed in the ratio of between 1/10 and 1/100 of flocculating agent to coagulating agent.

DESCRIPTION OF THE PREFERRED EMBODIMENTS

Figure 1:
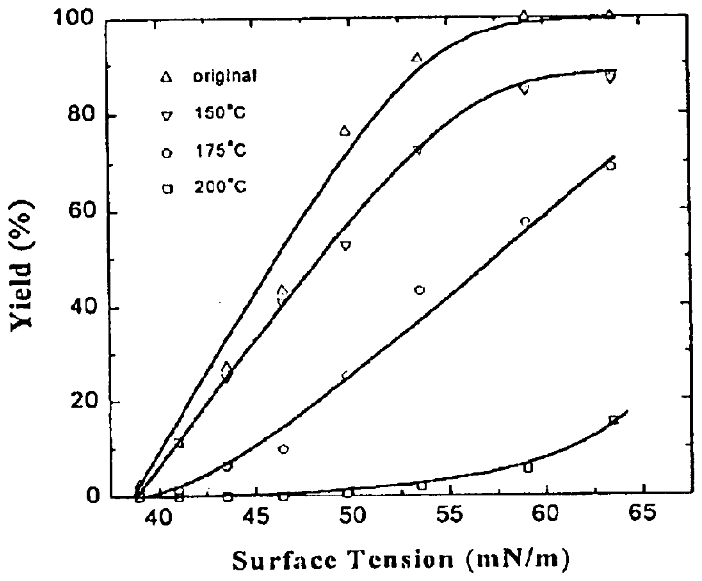
FIG. 1 is a graph showing the effect of oxidation temperature on coal surface hydrophobicity evaluated by thin film flotation (coal particles in −417+208 μm size fractions were oxidized for 24 hours).

The present invention comprises mixing an extraction oil with an aqueous suspension of fine coal particles containing other particles such as fine clay particles, as found for example in coal tailings, for a period of time sufficient to form a coal rich oil phase which floats i.e. the coal fines are extracted into the oil phase which phase-separates or floats on the aqueous phase to provide a non-aqueous phase that may be recovered using known techniques to provide a separated coal rich oil fraction. The coal rich oil fraction containing the coal fines forms a coal-in-oil mixture that may be used directly as a fuel product.

Any suitable extraction oil may be used which includes anything from kerosene to vegetable oil, heavy crude, light mineral oils, fuel oils and landfill gas condensates, but preferably the oil will be selected from the group including heavy crude, light mineral oils, fuel oils and landfill gas condensates.

Preferably at the same time as the oil is mixed with the aqueous phase it is simultaneously mixed with either a flocculating agent, a coagulating agent or a combination of flocculating agent and coagulating agent which promotes aggregation of other particles (rejects) that sink, leaving a clarified aqueous phase, which may be used for any suitable purpose, the most likely being recycled to the processing plants.

If desired the aqueous suspension of fine coal particles containing other particles may be first mixed with the oil to form a modified aqueous phase and then a flocculating agent, a coagulating agent or a combination of flocculating agent and coagulating agent may be mixed with the modified aqueous phase and the other particles permitted to sink to provide the clarified aqueous phase for reuse.

Following the conditioning i.e. mixing with the oil and flocculating agent, coagulating agent or a combination of flocculating agent and coagulating agent, the separation may be carried out in a vessel, or if desired the floats may be separated in one vessel and the other fine particles in a second vessel or pond to provide the clarified water.

Generally the initial suspension (tailings) will contain particles in the size range below 2 mm. and will have a solids content in the range of about 1 to 10% by dry weight solids with the coal comprising about 20 to 70% by weight of the solids.

The extraction oil will be added in the amount of between about 100 and 250% based on the dry weight of coal in the suspension.

The flocculating agent will normally be added in the concentration below 30 ppm, and a coagulating agent in the concentration of up to about 1000 ppm, or a combination of the two in the ratio of between 1/10 and 1/100 of flocculants to coagulant.

The preferred flocculants or flocculating agent for use in the present invention includes cationic or anionic flocculants and the preferred coagulant or coagulating agent includes positively charged aluminum hydrosols or multivalent cations, such as calcium or magnesium.

When a combination of flocculants and coagulant is used, the preferred combination will contain an anionic flocculants and multivalent cations.

EXAMPLES

Sample Preparation

Sample 1. The gravity circuit concentrate from Smoky River Coal Ltd. was used in this study. The coal chunks retained on 1½ screen after wet-screen were further cleaned using a heavy fluid of density 1.35 (mixture of Perchloroethylene and Varsol). The floats were thoroughly washed with tap water and pulverized in a laboratory pulverizer (Brinkmann Instruments Ltd., Type ZM-1). The pulverized coal was sieved into various size fractions, each sealed in a glass bottle and stored in a freezer at −4° C. The samples prepared as such were referred to as clean coal with ash content for each size fraction being given in Table 1. To control surface hydrophobicity, the clean coal sample was further oxidized in a well-ventilated oven at 150, 175 or 200° C. for 24 hours prior to extraction tests. The thin film flotation (WILLIAMS, M. C. and FUERSTENAU, D. W., 1987. A Simple Flotation Method for Rapidly Assessing the Hydrophobicity of Coal Particles, Int. J. Miner. Process., 20, p. 153–157.) was conducted to determine the wetting characteristics of the resultant samples, which was considered as a measure of surface hydrophobicity. In these tests, methanol-water mixtures of varying concentrations were used as probing liquids.

TABLE I

Ash Distribution in Pulverized Clean Coal Samples Used in the Case Studies.

| Size (μm) | Weight (%) | Ash (%) |
|---|---|---|
| +1180 | 4.68 | 4.59 |
| 1180 × 589 | 11.15 | 4.43 |
| 589 × 417 | 9.35 | 4.51 |
| 417 × 208 | 25.61 | 4.40 |
| 208 × 150 | 16.91 | 3.96 |
| 150 × 74 | 13.31 | 4.23 |
| 74 × 38 | 16.55 | 4.30 |
| −38 | 2.44 | 4.33 |
| Total | 100.00 | 4.31 |

Sample 2. A fine coal tailings sample taken from the tailings stream of the 2nd bank of flotation cells at Smoky River Coal Ltd. was tested. To simplify the test procedures, the solids in the stream were collected after filtration and dried at 105° C. The fine solid samples with a top particle size of 500 μm contained 37.7% mineral matters. To study the effect of particle size on process performance, a portion of the sample was dry-screened to obtain −45 μm size fractions. The sample obtained as such contained 41.1% mineral matters.

Sample 3. A combined thickener underflow, i.e., total fine refuse from preparation plant, at OBED Coal Ltd. was tested. A portion of the samples were wet-screened to separate the −45 :m size fractions which contain 83.6% mineral matters and used as clays. The remaining fractions containing 52% mineral matters and as-received tailings samples were tested with the current technology.

Chemicals

Analytical grade light mineral oil was purchased from Anachemia, Canada. The cationic (Magnifloc 591-C, MW of~200,000), anionic (Superfloc 218 Plus, MW of~$10^6$) and nonionic (Superfloc 127 Plus, MW of~$10^6$) flocculants were provided by Cytec Industries Inc., USA. Analytical grade calcium chloride was purchased from Fisher Scientific, Canada. All the chemicals were used as received. Unless otherwise stated, all the experiments were carried out at room temperature with de-ionized water prepared using an Elix-5, followed by the purification with a Millipore-UV unit (Millipore, Canada).

Procedures

The batch type experiments were conducted in a 400 mL glass beaker. The coal slurry was prepared by adding 5.76 grams of dried sample into 200 mL of de-ionized water under mechanical agitation at 1300 rpm for 5 minutes (Caframo Lab. Stirrer 4405–10, Cole-Parmer). This resulted in a pulp of 2.8% solids, corresponding to the percent solids in the original coal tailings stream.

In a typical extraction test with clean coal samples, the desired amount of mineral oil, flocculants and/or coagulant were added into the resultant coal slurry under mechanical agitation. A conditioning period of 10, 2 and 0.5 minutes after the addition of mineral oil, coagulant and flocculants, respectively, was allowed, with the order of addition being altered. After conditioning, the slurry was poured as quickjy as possible into a separatory cylinder. Following a 15-minute settling during which phase separation occurred, the rejects (aqueous phase) and floats (organic phase) were separated into a beaker and an aluminum pan, respectively. The solids retained in the aqueous phase were filtered on a filter circle fixed on a funnel, washed with toluene, dried in the oven at 105° C. for 5 hours, and weighed. The solids extracted in the oil phase were then determined from mass balance. The yield of solids retained in the oil phase was used to evaluate the extraction performance. Similar procedures were applied to the tailings sample. In this case, the ash content of the feed and solids in the aqueous phase was determined in accordance with ASTM (D 3174). The combustible recovery and ash content in organic phase were then calculated based on the solid mass of the feed and rejects, along with their ash contents. The amount of suspended solids remaining in the treated water was determined by a spectrophotometer (Spectronic 21, Spectronic Instruments, Inc.) after calibration.

Thin Film Flotation

The results from thin film flotation tests are shown in FIG. 1. It is clear that with increasing the oxidation temperature, coal surface gets progressively oxidized as indicated by a decreased fraction of solids in floats for a given probing liquid. The significant decrease, however, occurred at an oxidization temperature of 175° C. as the thin film flotation curve changed from convex to concave shape. A similar observation was reported earlier for other coal samples (see XU, Z. and YOON, R., 1989. The Role of Hydrophobic Interactions in Coagulation, J. Colloid Interface Sci., 132, p. 532–541.).

Hydrophobic Extraction

Figure 2:
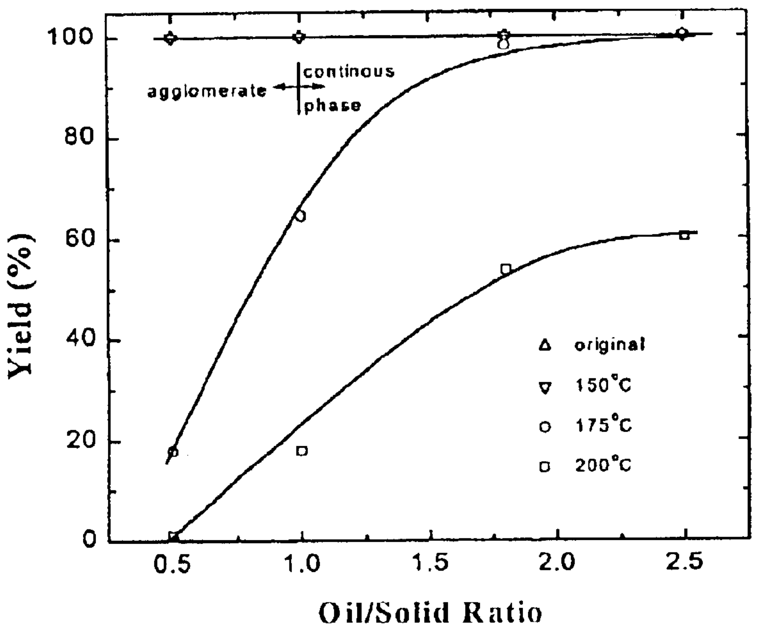
FIG. 2 is a graph showing the effect of surface hydrophobicity on hydrophobic extraction as a function of oil/solid ratio (coal particles in −417+208 μm size fractions were oxidized for 24 hours).

Role of surface hydrophobicity: The role of surface hydrophobicity in hydrophobic extraction of coal into oil phase is shown in FIG. 2. For clean coal samples without further oxidation, obtained is an extraction yield of almost 100% coal in oil phase as either agglomerates (at oil/solid ratio below 1) or coal-in-oil mixture (at oil/solid ratio above 1). The results suggest the existence of minimum oil to solid ratio of 1 for coal extraction in contrast to oil agglomeration. Also noted in FIG. 2 is a negligible effect of coal oxidation at up to 150 ° C., although a reduction in surface hydrophobicity was noted under these oxidation conditions (FIG. 1). A significant decrease in coal extraction, in particular at oil to solid ratio below 1, was observed with coal samples oxidized at 175° C. This transition corresponded well with that found in thin film flotation tests. Further increase in oxidation temperature caused a further decrease in extractability of coal into the oil phase. These findings illustrate the important role of surface hydrophobicity in coal extraction by oil. Clearly, a minimum surface hydrophobicity with a critical surface tension of ca. 55 mN/m is needed for effective extraction of coal by oil. Incidently, this surface tension value corresponded well with typical mineral oil-water interfacial tensions.

Figure 3:
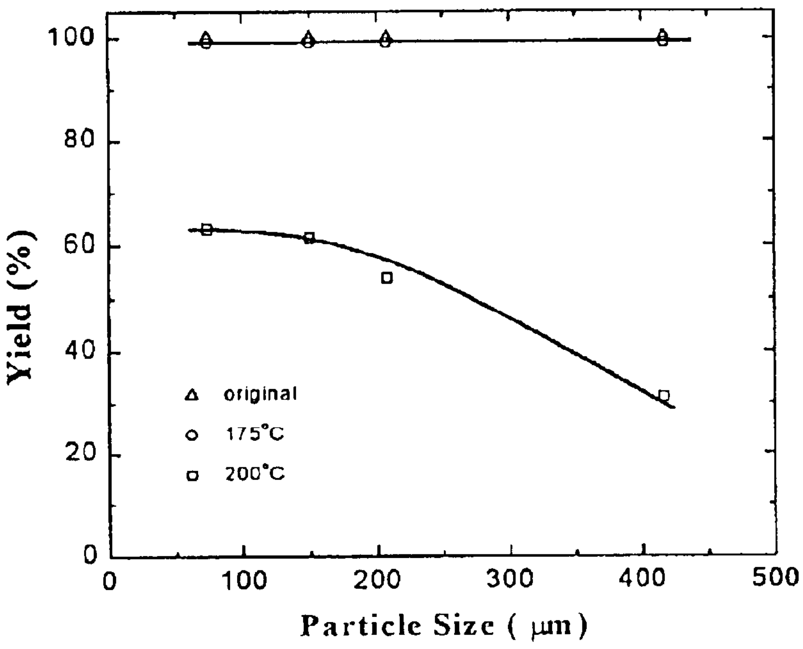
FIG. 3 is a graph showing the effect of particle size on hydrophobic extraction at oivsolid ratio of 1.8.

Effect of particle size: The effect of particle size on hydrophobic extraction of coal by mineral oil was exarnined at the oil to solid ratio of 1.8 to ensure a process of hydrophobic extraction as oppose to oil agglomeration. The results in FIG. 3 show that with strongly hydrophobic (clean) coal samples, the extraction yield reached almost 100% for all the size fractions examined. This finding suggests that over a wide particle size range, the hydrophobic extraction is insensitive to particle sizes. The similar extraction results were obtained with coal samples oxidized at up to 175° C. However, with coal samples oxidized at 200° C., a significant decrease in extraction yield was observed with the samples in coarser size fractions (grater than 200 μm size). Clearly, the upper limit of sizes for particles to be extractable is determined by the balance of the gravitational force against interfacial tension force, which is a strong function of surface hydrophobicity.

Figure 4:
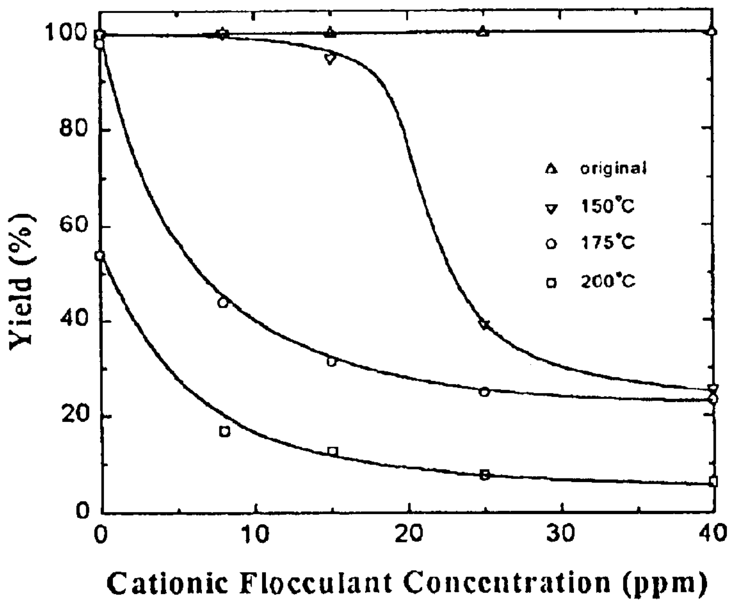
FIG. 4 is a graph showing the effect of order of flocculent addition on hydrophobic extraction at oivsolid ratio of 1.8 (coal particles in −417+208 μm size fractions were oxidized for 24 hours).
Figure 5:
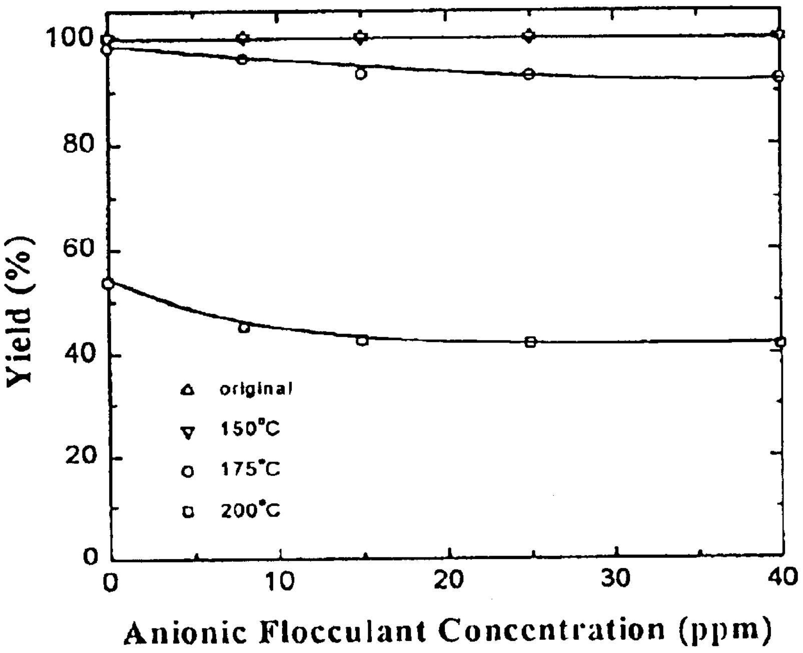
FIG. 5 is a graph showing the effect of anionic flocculants added prior to mineral oil on hydrophobic extraction at oil/solid ratio of 1.8 (coal particles in −417+208 μm size fractions were oxidized for 24 hours).

Effect of additives: Since one of our objectives is to develop a single step process capable of recovering clean coals from coal tailings stream and at the same time clarfying the process water for recycle or safe disposal, it is important to examine the effect of flocculants or/and coagulant to be used in clarification on extractability of fine coals. As shown in FIG. 4, when added before the mineral oil (oil to solid ratio of 1.8), the cationic flocculants showed no effect on extractability of clean (fresh) coal samples with an almost 100% yield being retained. For coal samples oxidized at 150° C., however, a decreased yield with increasing flocculants concentration was observed. This decrease in extraction yield continued with further increase in oxidation temperatures. It appears that the coal particles carry a net negative surface charge over the pH range studied (between 5 to 7) and the increased negative surface charge upon oxidation of coal enhanced adsorption of cationic flocculants, which further reduced the surface hydrophobicity. Another contributing factor for the decreased yield with increasing cationic flocculants concentration could be the increased aggregate size arising from flocculation of increasingly oxidized coal particles. With the anionic flocculants, however, the addition of flocculants did not show substantial effect on the extraction yields of coal samples oxidized at various temperatures, as seen in FIG. 5. This finding further confirms that the coal surface carriers progressively more negative surface charges upon oxidation, which did not respond to the addition of the anionic flocculants. The electrostatic repulsive force between anionic flocculants and negatively charged coal surface appears to prevent the flocculants from adsorbing on coal, showing no effect on surface hydrophobicity and hence extraction yield of coal samples. A noticeable decrease in extraction yield for coal samples oxidized at 200° C. may be an indication of marginal flocculants adsorption through hydrogen bonding, hindered by the electrostatic repulsive forces.

Figure 6:
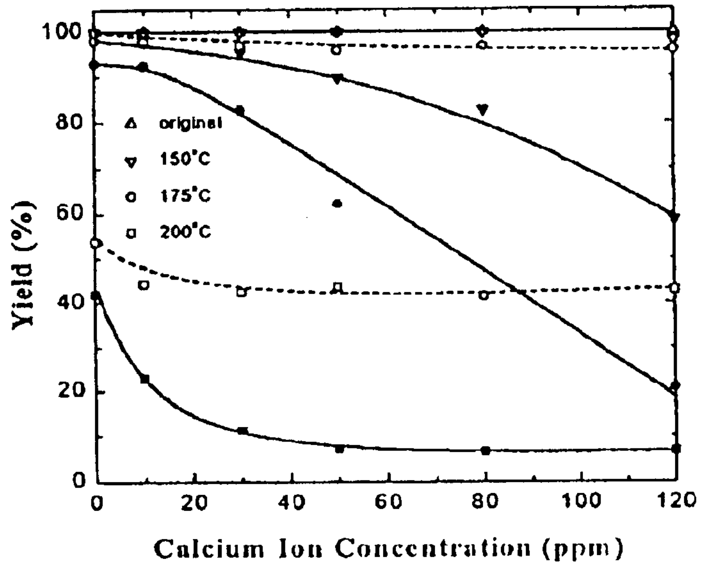
FIG. 6 is a graph showing the effect of coagulant added prior to mineral oil on hydrophobic extraction at oil/solid ratio of 1.8 (coal particles, −417+208 μm; solid symbols, with anionic flocculants; open symbols, no anionic flocculants).

It was anticipated that the use of inorganic coagulants such as positively charged aluminum hydrosols or multivalent cations, before the mineral oil addition, could decrease the extraction yield by decreasing hydrophobicity or/and increasing the size of coal aggregates, should coagulation occur. However, with calcium or possibly other multivalent cations, this effect was not observed with coal samples oxidized below 175° C. A marginal decrease in coal extraction was observed with coal samples oxidized at temperatures higher than 175° C., as shown in FIG. 6 (open symbols). It appears that only at a sufficiently high oxidation temperature, can carbons on coal surface become oxidized to carboxylic groups amenable for specific adsorption by calcium, thus reducing the hydrophobicity and hence hydrophobic extractability.

As shown in FIG. 6 (solid symbols), a significant decrease in extraction yield was observed for coal samples oxidized at temperatures as low as 150° C. when anionic flocculants (25 ppm) and calcium were present. It is clear that the adsorption of calcium in the electrical double layer appears to be sufficient to induce the adsorption of anionic flocculants, which decreases the surface hydrophobicity and increases aggregate size by flocculation as visually observed. As a result, a decreased coal extraction yield is anticipated as observed experimentally. This synergetic action by calcium and anionic flocculants was further enhanced with coal samples oxidized at higher temperatures.

The results plotted in FIG. 6 clearly show that for hydrophobic coals, it is feasible to recover them by hydrophobic extraction from a slurry in the presence of the coagulant and flocculants needed to aid the clarification of the effluent in a single step. For weakly hydrophobic coals, however, the presence of coagulant and flocculants hindered coal extraction into oil phase. In this case, it is vital to extract the coal into the oil phase prior to coagulant/coagulant addition to make the process work. To test this hypothesis, the extraction tests were conducted by adding the mineral oil to a coal slurry first. The results given in Table 2 show that adding coagulant and flocculants after the mineral oil did not change the extraction yield of coal oxidized at 175 and 200° C. In contrast, a significant decrease in extraction yield from 98 and 55% to 62 and 7% was observed for coal samples oxidized at 175 and 200° C., respectively, when the mineral oil was added after coagulant and flocculants. This finding confirms the importance of the chemical addition scheme. Clearly, after hydrophobic coal particles being extracted into the organic phase, water-soluble species has little effect on those particles in the organic phase, but would act on the particles in aqueous phase. It appears that with the well-defined reagent addition scheme, the integrated approach would work satisfactorily even with less hydrophobic (oxidized) coals that froth flotation may not be effective to recover.

TABLE II

Effect of Reagent Addition Order on Process Performance.

| Order of Reagent Addition | % Yield from Oxidized Coal 175° C. | % Yield from Oxidized Coal 200° C. |
|---|---|---|
| Oil Extraction Only | 98 | 53 |
| Oil Extraction Followed by Reagent Addition | 98 | 55 |
| Reagent Addition Followed by Oil Extraction | 62 | 7 |

Oil Phase Separation

Figure 9:
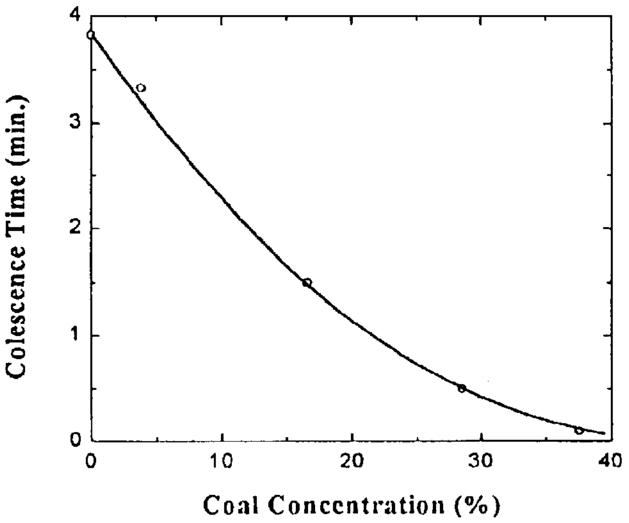
FIG. 9 is a graph showing the role of hydrophobic coal on coalescence of oil droplets.

In order to facilitate the integrated coal extraction process, it is important to promote the coalescence of oil droplets. The effect of hydrophobic coal addition on coalescence time is shown in FIG. 9. Clearly, fine clays, were capable of stabilizing oil droplets, which may result in a reduced hydrophobic coal extraction yield. The addition of hydrophobic coal enhanced the coalescence of oil droplets, more pronounced with increasing the amount of fine coals.

Integrated Process

Figure 7:
FIG. 7 is an illustration of hydrophobic extraction, flocculation and/or coagulation in a single stage process: a) hydrophobic extraction, b) a plus electrolytic coagulation, c) a plus flocculation, and d) all three mechanisms, i.e., a, b and c.

The integration of three mechanisms, i.e. hydrophobic extraction of fine coals and a combination of coagulation and flocculation to clarify process water for recycle, in a single process is demonstrated in a case study with an industrial coal flotation tailings sample taken from Smoky River Coal Ltd. As shown in FIG. 7*a*, adding clear mineral oil into the coal tailings slurry at oil to coal ratio of 1.8, resulted in a black, continuous oil phase on the top of the aqueous phase, confirming hydrophobic extraction of fine coals in oil phase. Also shown in FIG. 7*a* is a cloud aqueous phase (lower part) even after the suspension was left overnight, illustrating the need for clarification of the effluent for recycling. This features the second novelty of the process.

Figure 8:
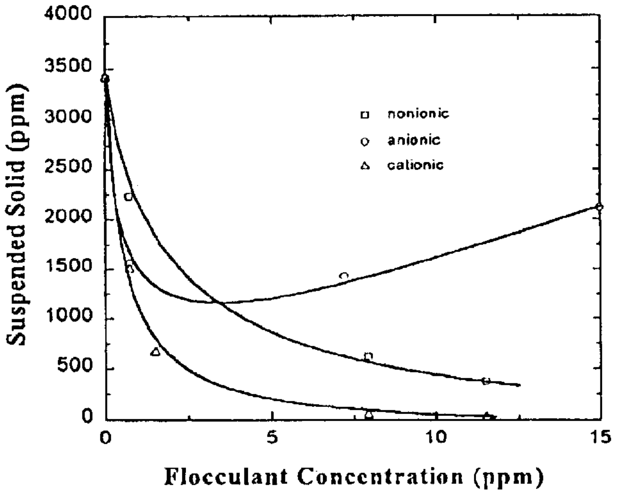
FIG. 8 is a graph showing the clarity of processed water as a function of flocculants concentration.

As shown in FIG. 8, the addition of cationic flocculent significantly reduced the amount of solids remaining in the processed water. However, the bulk aqueous phase remained dark as seen in FIG. 7*c*. Apparently, this water cannot be discharged without further treatment. Compared to the cationic flocculant, the nonionic and anionic flocculants were found less effective as shown in FIG. 8. Adding 100 ppm calcium alone as coagulant was able to clarify the effluent from an original solid content of 3500 ppm to 410 ppm, but the supernatant remained dark as seen in FIG. 7*b*. These results suggest that flocculants or coagulant alone is unlikely to clarify the effluent to the desired level for safe discharge or recycle. A combination of coagulation and flocculation is therefore considered. A sharp decrease of suspended solids in the treated water was indeed observed when calcium and anionic flocculants were added together. In the presence of 1.5 ppm anionic flocculants, the addition of 100 ppm calcium resulted in a reduction in suspended. solids from 1250 ppm to below 20 ppm, with a clear water zone sandwiched between a black top oil phase and bottom sediments as seen in FIG. 7*d*. The quantitative analysis showed that this process is capable of achieving a combustible recovery greater than 88% at a product ash content less than 11%, while producing a clean water containing less than 20 ppm suspended solids (Table 3). The improved product ash content from 21.7 to 10.5% with decreasing feed particle size, is attributed to the increased degree of liberation with decreasing particle size. In both cases, the oil recovery in organic phase is close to 100% and the solid content in discharge water meets the limit (20 ppm) for recycle and discharge (DOWN, C.G. and STOCKS, J., 1977. Environmental Impact of Mining. Applied Science Publication, London, p. 108–109.

TABLE III

Effect of Feed Particle Size on Process Performance

| Analysis | −325 Mesh Fraction | Tailing as Received |
|---|---|---|
| Ash Content in Feed (%) | 41.1 | 37.7 |
| Ash Content in Float (%) | 10.5 | 21.7 |
| Ash Content in Reject (%) | 81.7 | 80.0 |
| Combustible Recovery (%) | 88.8 | 91.2 |
| Suspended Solid in Water (ppm) | 18.0 | 15.0 |

Application to OBED Coal Tailings

Applying the current invention to OBED coal tailings resulted in a combustible recovery of 7.6% only although the ash content in the organic phase was reduced from feed value of 67.7 to 31.1% as shown in Table IV. The extremely low combustible recovery is attributed to the presence of 42.8% fine clays which stabilized coal-extracted oil droplets that sank with mineral matters. Removal of fine size fraction of clays improved the combustible recover only marginally to 14.3%, but improved product ash content significantly to 11.8% due to the reduced entrainment. However, a combustible recovery of 85.3% with an ash content of 13.6% in the product was obtained by regrinding +45 :m size fraction of the original tailings, which generated fresh hydrophobic surfaces. The newly generated hydrophobic surfaces promoted the oil droplets coalescence and facilitated phase separation.

TABLE IV

Process Applied to OBED Tailings

| | As received sample | | Pre-cut sample | |
|---|---|---|---|---|
| | No grind | Ground | No grind | Ground |
| Combustible recovery (%) | 7.6 | 10.8 | 14.3 | 85.3 |
| Ash content in product (%) | 31.1 | 37.7 | 11.8 | 13.6 |
| Ash content in feed (%) | 67.7 | | 52.2 | |

Some Features of the Invention

It should be noted that the hydrophobic oil extraction featured in this process is conceptually different from the oil agglomeration process, in which case oil is used as a bridge to link particles. The current process produces a liquid fuel in the form of coal-in-oil mixture (COM). As a result, the moisture content entrapped by fine coal in oil phase is minimal compared to the moisture in flotation froth product even after dewatering. Therefore, a higher thermal efficiency is anticipated from coal-in-oil fuel. Another added advantage of the liquid fuel from coal tailings produced by the present invention is the easy handling and transportation of slurry product. The COM is currently used in water-tube boilers originally designed for oil firing.

An oil-to-coal ratio of ca 1.8 in our final product is within the acceptable ratio range of 1 to 4 required for a typical COM produced by blending finely pulverized coal with heavy fuel oil and various additives (Schumacher, 1981). It is well documented that the combustion of COM containing 13% coal at 20 to 25% ash could yield a boiler efficiency identical to those achieved by burning No. 6 fuel oil, as demonstrated in a New Brunswick power station (MORRISON, G. F., 1979. Conversion to Coal and Coal/Oil Firing. IEA Coal Research, London, ICTIS/TR 07, December, p. 26–52.). With the use of a heavy crude, the coal-in-oil mixture produced from coal tailing's stream using our process is well suited for a commercial high-Btu fuel.

Figure 10:
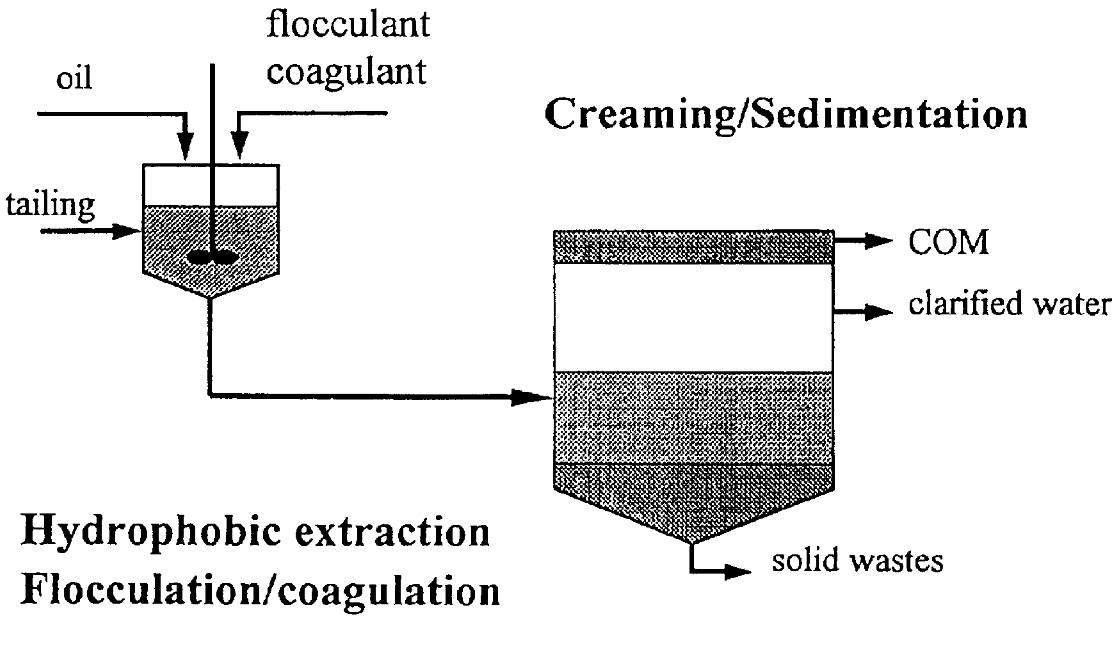
FIG. 10 is a graph showing schematically the concept of reactor/separator for the integrated technology.

Also a featured of the present invention is the possibility of integration of hydrophobic extraction with solid/liquid separation using a combination of anionic flocculant and multivalent metal coagulant in a single stage unit operation. The recycle of the process water in this single stage process is attractive from both an economic and environmental point of view. The process itself can be engineered at minimum capital and operating cost, as a simple thickener could be used as a reactor and separator as illustrated in FIG. 10.

Based on the above descriptions it is apparent that

1. Hydrophobic fine coals are readily extracted into oil phase. The efficiency of coal extraction is governed by the surface hydrophobicity of coal. A minimum surface hydrophobicity with a critical surface tension of 55 mN/m was needed for effective extraction of coal by oil.
2. Hydrophobic extraction is effective for recovery of coals over a wide particle size range (up to 2 mm) as long as they are sufficiently hydrophobic.
3. The addition of flocculent was found to be unfavorable to coal extraction, but necessary to clarify the process water for recycling. To make this process effective, the extraction of coal with moderate hydrophobicity should be accomplished prior to the flocculant and coagulant addition.
4. Flocculant or coagulant alone was found not to be as effective as the use of the combination of the two to reduce the suspended solid in process water to a limit of 20 ppm for recycling or discharge. The combination of the two, at a much-reduced dosage, was found to be effective to aggregate fine mineral matters and clays, resulting in a process water suitable for recycling.
5. A process integrating three distinct mechanisms, i.e., hydrophobic extraction, electrolyte coagulation and macromolecular flocculation in a single stage for treating coal tailings is achieved: for
   a) recovering marketable clean coals as the product of marketable clean fuel in the form of coal in oil mixture;
   b) clarifying process water for recycling and reducing solid waste disposal, mitigating environmental consequences of coal tailings.

Having described the invention modifications will be evident to those skilled in the art without departing from the spirit of the invention as defined in the appended claims

What is claimed is:

1. A method of extracting coal fines from an aqueous phase containing suspended coal fines and hydrophilic mineral matters comprising mixing an extraction oil with the coal fames suspended in said aqueous phase, the oil being added in an amount effective to extract the coal fines by hydrophobic extraction and form a nonaqueous phase containing said coal fines and said oil and a modified aqueous phase containing said hydrophilic mineral matters, adding at least one of a flocculating agent, a coagulating agent or a combination of said flocculating agent and said coagulating agent to at least one of said aqueous phase and said modified aqueous phase to separate said hydrophilic mineral matters and provide a clarified aqueous phase and wherein said mixing of said extraction oil and said adding of said at least one of said flocculating agent, said coagulating agent or said combination of the two for recovering fine coals is integrated into a single stage to seperate said nonaqueous phase from said clarified aqueous phase and said hydropholic mineral matters, wherein said extraction oil is added in the amount of between 100 and 250% based on the dry weight of coal fines in the suspension.

2. A method as defined in claim 1 wherein said single stage includes removing said mineral matters from said aqueous phase to provide said clarified aqueous phase for recycling.

3. A method as defined in claim 1 wherein said extraction oil is selected from the group consisting of heavy crude, light mineral oils, fuel oils and landfill gas condensates.

4. A method as defined in claim 1 wherein said one comprises said flocculating agent, which is added to a concentration below 30 ppm.

5. A method as defined in claim 4 wherein said flocculating agent is selected front the group consisting of cationic and anionic flocculants.

6. A method as defined in claim 1 wherein said one comprises said coagulating agent, which is added to a concentration of up to about 1000 ppm.

7. A method as defined in claim 6 wherein said coagulating agent is selected from the group consisting of positively charged aluminum hydrosols and multivalent cations.

8. A method as defined in claim 1 wherein said one comprises said combination of said flocculating agent and said coagulating agent for separation of said hydrophilic mineral materials from said aqueous suspension.

9. A method as defined in claim 8 wherein said flocculating agent is an anionic flocculants and said coagulating agent comprises multivalent cations.

10. A method as defined in claim 9 wherein said flocculating agent is added to a concentration below 30 ppm.

11. A method as defined in claim 10 wherein said coagulating agent is added to a concentration of up to about 1000 ppm.

12. A method as defined in claim 11 wherein said flocculating agent and said coagulating agent are mixed in the ratio of between $1/10$ and $1/100$ of flocculating agent to coagulating agent.

* * * * *